(No Model.) 4 Sheets—Sheet 1.
W. BLACK.
MACHINE FOR CUTTING PULLEY STILE POCKETS.
No. 565,875. Patented Aug. 18, 1896.
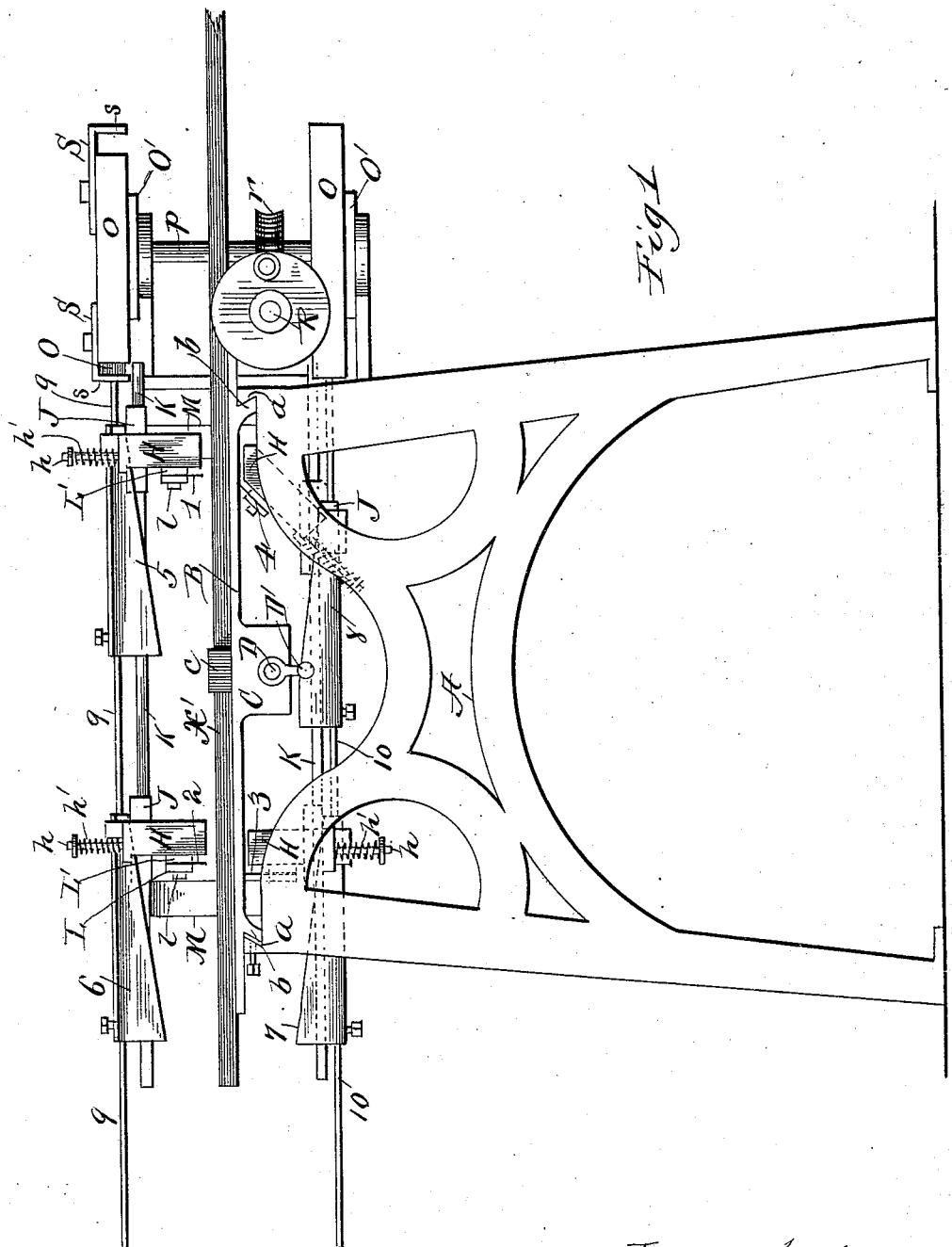

(No Model.) 4 Sheets—Sheet 2.
W. BLACK.
MACHINE FOR CUTTING PULLEY STILE POCKETS.
No. 565,875. Patented Aug. 18, 1896.
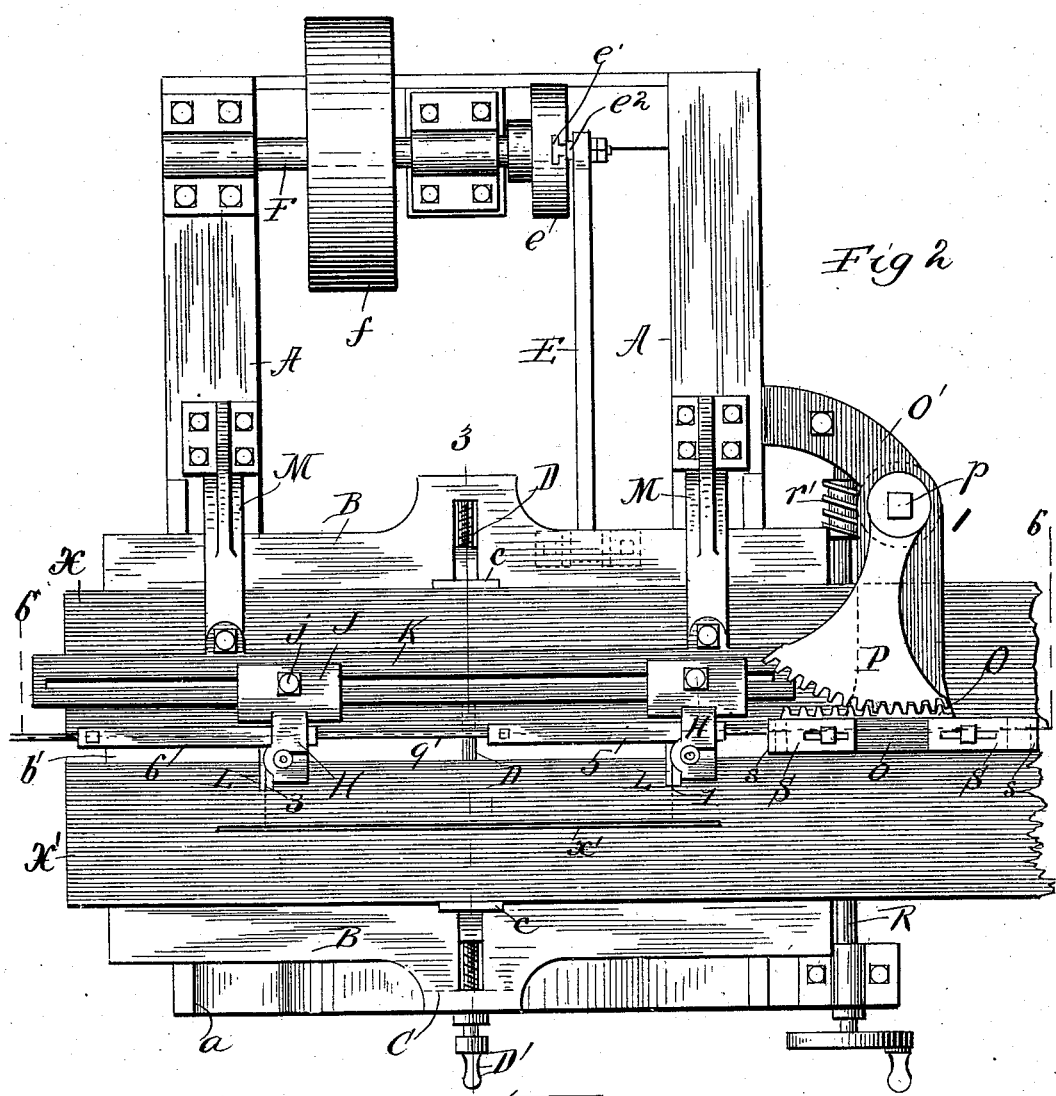
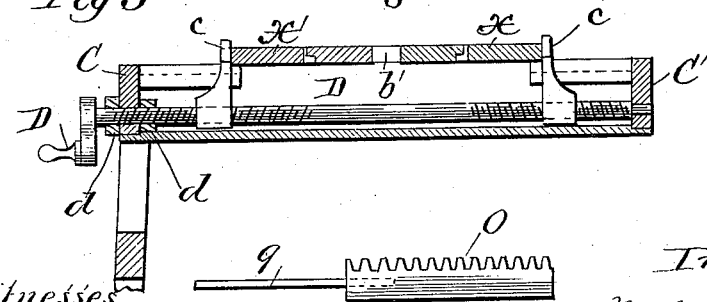
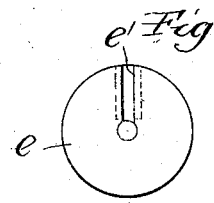
Witnesses
W. C. Corliss
A. J. West
Inventor
Walter Black
By Louis K. Gibson
Attorney.

(No Model.) 4 Sheets—Sheet 3.
W. BLACK.
MACHINE FOR CUTTING PULLEY STILE POCKETS.
No. 565,875. Patented Aug. 18, 1896.
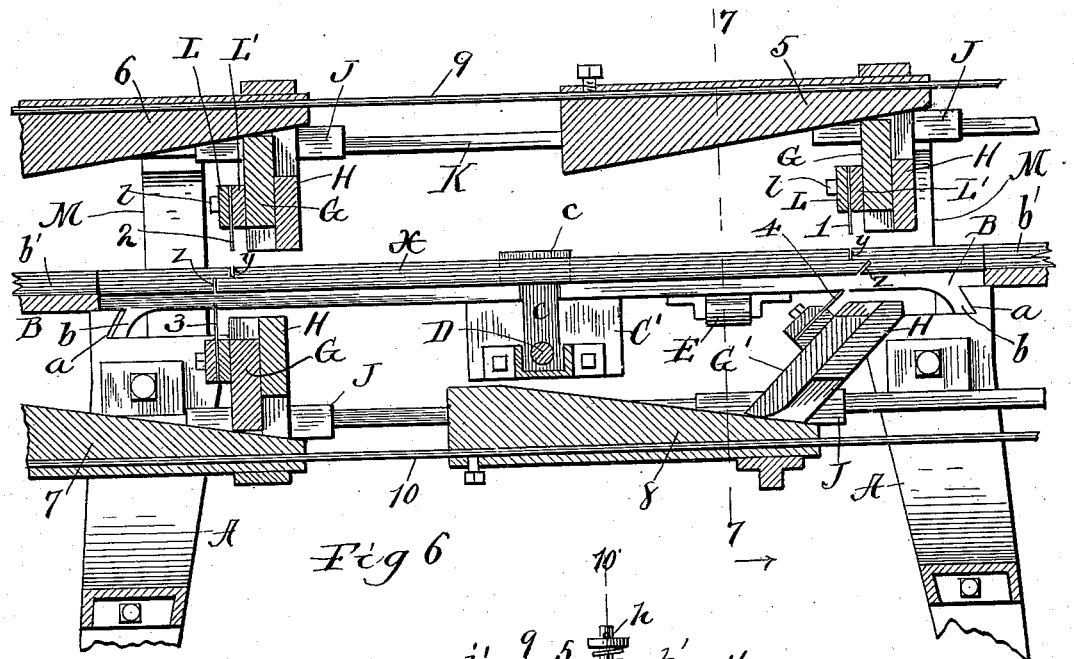
Fig 6
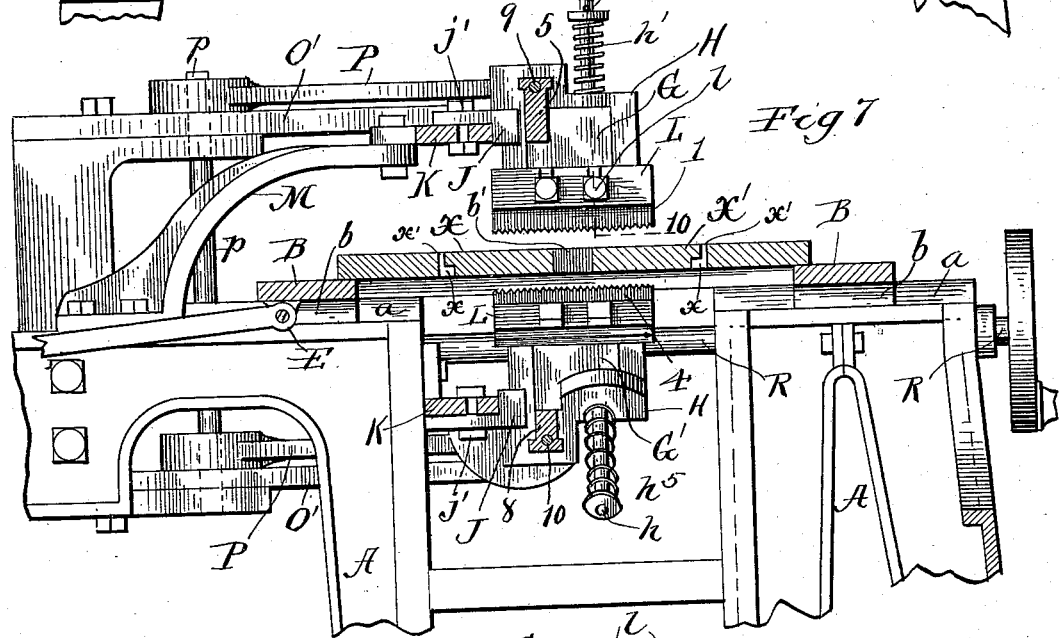
Fig 7
Fig 8
Witnesses
W. C. Coelies
A. J. West
Inventor
Walter Black
By Louis K. Gillson
Attorney (No Model.) 4 Sheets—Sheet 4.
W. BLACK.
MACHINE FOR CUTTING PULLEY STILE POCKETS.
No. 565,875. Patented Aug. 18, 1896.
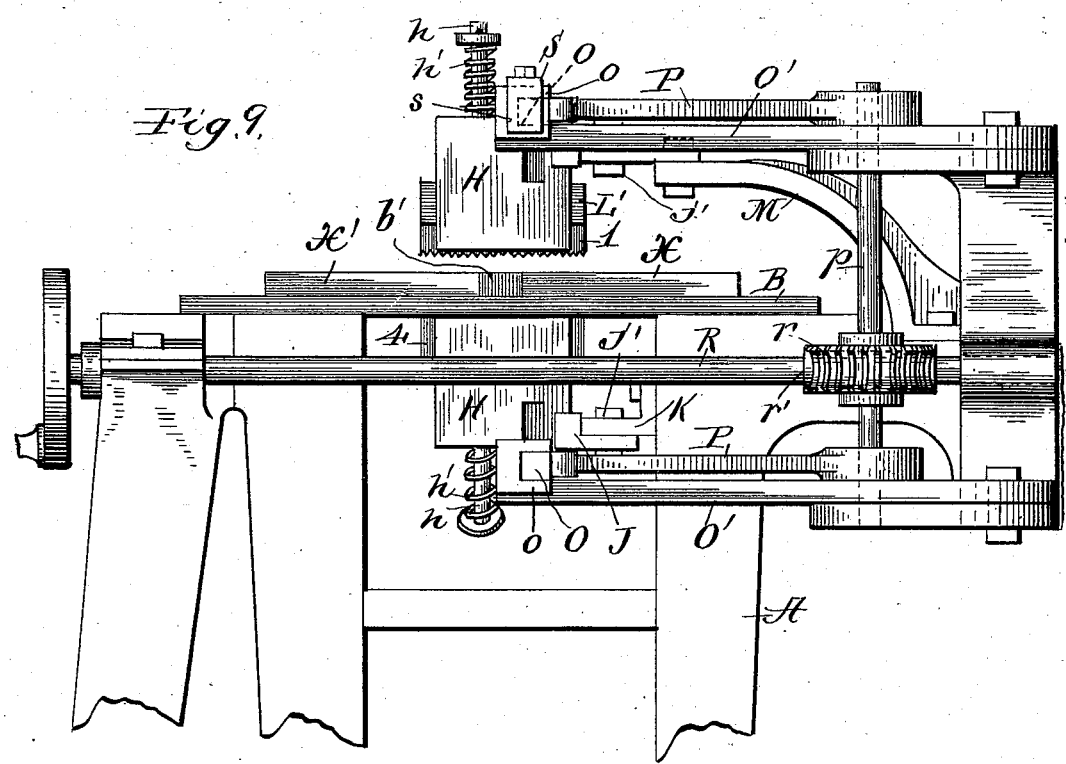
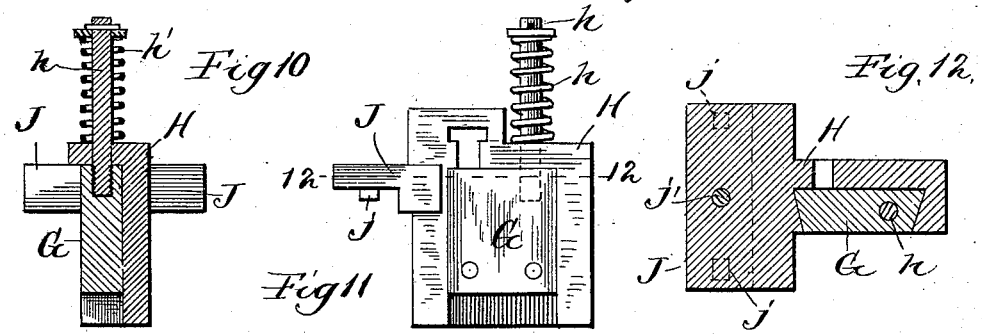
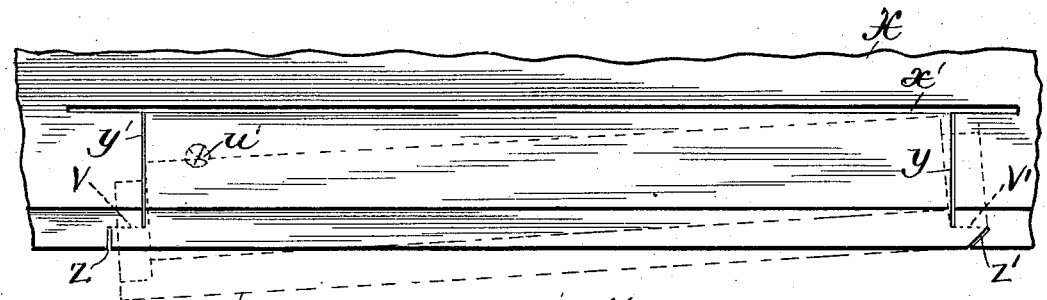
Witnesses
W. C. Coolies
A. J. West
Inventor
Walter Black
By Louis K. Gibson
Attorney _United States Patent Office._

WALTER BLACK, OF CHICAGO, ILLINOIS.

MACHINE FOR CUTTING PULLEY-STILE POCKETS.

SPECIFICATION forming part of Letters Patent No. 565,875, dated August 18, 1896.

Application filed September 14, 1895. Serial No. 562,525. (No model.)

*To all whom it may concern:*

Be it known that I, WALTER BLACK, a citizen of the United States, residing at Chicago, in the county of Cook and State of Illinois, have invented certain new and useful Improvements in Machines for Cutting Pulley-Stile Pockets; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

It is the usual practice to cut the pockets in pulley-stiles of window-casings by hand, a continuous diagonal cut being made entirely through the stile at each end of the pocket. This manner of cutting such pockets is not only very slow but it produces an imperfect joint, the block cut from the stile necessarily sinking below the face of the latter when put in place, and it being necessary also to use nails in retaining it until the casing is set and the dividing-strip introduced.

The object of this invention is to produce a machine which will rapidly cut pockets of this character, forming them with a rabbeted joint, the machine making the transverse cuts, but leaving the blocks in place to be removed by the carpenter in setting the casing by breaking the longitudinal portion of the rabbeted joint by a slight blow with the hammer. The cut made from the outer surface of the stile and at the upper end of the pocket is preferably oblique, bearing upwardly, so as to form a lock by which the block is prevented from falling out.

The invention consists in mounting four saws in such manner that they will make the necessary cuts simultaneously into both surfaces of the stile to form the joints at both ends of the pocket.

It consists, further, in the peculiar manner of mounting and operating the saws, as hereinafter fully set forth.

In the accompanying drawings I show, in Figure 1, a front elevation of the machine; Fig. 2, a plan view of the same; Fig. 3, a detail section on the line 3 3 of Fig. 2; Fig. 4, an elevation of the crank-wheel used in communicating the reciprocating motion to the carriage of the machine. Fig. 5 is a detail of a rack used in manipulating the saws. Fig. 6 is a vertical section on the line 6 6 of Fig. 2. Fig. 7 is a vertical section on the line 7 7 of Fig. 6. Fig. 8 is a detail showing the action of the saw upon a pair of stiles. Fig. 9 is a detail end elevation of the machine. Figs. 10, 11, and 12 are details of the blocks for carrying the saws. Fig. 13 is a detail perspective of a pulley-stile which has been operated upon by the machine, and showing the manner of removing the block.

The machine is carried by a simple form of frame or standard A. The top of this frame is formed with ways $a\,a$, extending from front to rear, within which reciprocates a frame or carriage B for carrying the stiles X X' to be operated upon by the machine. Before being brought to this machine the stiles have been cut to form the longitudinal groove $x\,x$ to receive the dividing-strip, and along one side of this groove has been cut a kerf $x'$ to form one side of the pocket. The stiles are placed upon the carriage B transverse to the frame A and are spaced apart by a block $b'$ at each end to permit free discharge of sawdust. A simple form of clamp is used for holding the stiles upon the carriage, comprising the cooperating jaws $c\,c$, whose stems project downwardly through suitable slots in the carriage and are oppositely screw-threaded to receive a rod D, having upon one end a right screw-thread and at the other a left screw-thread, and which is journaled in hangers C C', pendent, respectively, from the front and rear of the carriage, its longitudinal movement being prevented by means of collars $d\,d$, located upon the opposite sides of one of these hangers, as shown the one at the front of the carriage. This rod D may be rotated for the purpose of adjusting the clamping-jaws by means of a hand-wheel D'.

A reciprocating motion is imparted to the carriage B by means of a pitman E, driven by a crank-wheel $e$, mounted upon a shaft F, which carries a pulley $f$, to which power is transmitted from any convenient line or counter shaft. In order to vary the stroke of the carriage B, the crank-pin of the wheel $e$ is radially adjustable. This adjustment is accomplished by using for a crank-pin a T-headed stud, the head being located within a radial T-groove cut in the wheel, a jam-nut $e^2$ being placed upon the crank-pin and turned up against the face of the wheel to secure the pin in the desired position.

Four saws are used for making the several cuts in the stile and are shown at 1, 2, 3, and 4, being arranged in pairs, one member of each pair being above and the other below the carriage B and in position to cut across the stiles mounted upon the carriage. The saws 2 and 3 for making the cuts at the lower end of the pocket are both perpendicular to the carriage and are set in planes spaced apart to correspond with the length desired for the longitudinal portion of the rabbeted joint. The saw 1 for cutting into the back of the stile at the top of the pocket is set perpendicular to the carriage, and the saw 4 for cutting into the face of the stile at the top of the pocket is set oblique to the carriage, so that that portion of the rabbeted joint at the top of the pocket is formed as an under-cut.

The saws 1 and 4 are so related that the bottoms of the cuts formed by them are spaced apart the necessary distance to form the longitudinal portion of the rabbeted joint.

Very thin saws are used, and in mounting them I use a pair of clamping-blocks L L', one upon each side of the saw, such blocks being approximately of as great length as the saw, thus serving to prevent the saw from bending when in use. For the convenient setting of the saw it is formed with recesses or slots extending in from its back to receive the binding-screw, thereby admitting of its adjustment by merely loosening the binding-screws.

The saws and their clamping-blocks are secured to sliding plates G by means of set-screws $l$. Each of the plates G is carried by a block H, within which it is adapted to reciprocate, so as to advance and withdraw the saw, the edges of the plates being adapted to undercut ways formed in the block. A rod $h$, set in the rearward edge of the plate G, projects through a suitable aperture in the back of the block H and carries a spiral spring $h'$, by means of which the saw is held normally in a withdrawn position. The blocks H are each provided with a lateral extension J, adapted to rest upon a longitudinally-slotted rail K, extending across the machine, a binding-screw $j'$ passing through the portion J and the slot of the rail for securing the block H in the desired position. The portion J is preferably provided with lugs $j$, adapted to extend into the slot of the rail K, thereby in connection with the binding-screw $j'$ positively preventing any angular movement of the block. The saws are conveniently adjusted for the purpose of varying the length of the pocket to be cut by sliding the blocks H along the rail K. The lower rail K is secured directly to the legs of the frame A. The upper rail K is carried by arms M M, springing from the rear portion of the frame and extending forwardly.

The advancement and recession of the saws is accomplished by means of cams of any suitable form. I show for this purpose cams 5, 6, 7, and 8, adapted to coöperate, respectively, with the saws 1, 2, 3, and 4, and being in the form of wedges adjustably mounted upon the rods 9 10, located transversely to the frame and respectively above and below the carriage B. These wedge-cams are adapted to suitable apertures in the blocks H, their beveled faces bearing upon outer edges or backs of the plates G, so that their advance moves these plates in opposition to the spring $h'$, thereby advancing the saws. I prefer to make the wedge-cams in T form in cross-section, whereby they are securely held against turning upon their carrying-rods when well withdrawn from the blocks H. These wedge-cams are secured to the rods 9 10 by set-screws and are necessarily adjustable that they may be in proper relation with the saws. The wedge-cams are reciprocated by means of racks O O, carried by the rods 9 10 and running in ways formed in the blocks $o\,o$, carried by the arms O' O', projecting forwardly and laterally from one side of the frame A. Geared sectors P P, carried by a vertical shaft $p$, journaled in the arms O' O', mesh with the racks O O. The shaft $p$ carries a worm-wheel $r$, meshing with a worm $r'$, formed on a rod R, projecting forwardly to the front of the machine and provided with a hand crank-wheel.

A stop is provided to limit the movement of the racks O O and consequently of the saws by securing to the blocks $o\,o$ plates S S, having lateral arms $s\,s$, lying across the path of the racks O O. These plates are longitudinally slotted and are secured to the blocks $o\,o$ by set-screws passing through their slots, so that they may be adjusted at pleasure. By this means the depth of the cuts made in the stile may be controlled accurately.

The stroke of the carriage is preferably so adjusted that the end of the saw never passes out of the front edge of the stile, the limit of the stroke being indicated in Fig. 8. The liability of the saw to tear the edge of the stile is thereby prevented.

It is obvious that the machine is adapted to cut rabbeted joints for other purposes as well as the one especially set forth, and also that for many parts of the machine other forms of construction might be used without changing the mode of operation.

For the sake of clearness I have shown in Fig. 13 a detail of the pocket cut by the machine. At $x'$ is shown the longitudinal kerf cut in the stile X to form one side of the pocket before the stile is brought to the machine. The block cut out to form the pocket is shown at $u$ and the cuts made by the saws 1, 2, 3, and 4 at $y$, $y'$, $z$, and $z'$, respectively. After the several cuts have been made a slight blow with a hammer at the point indicated at $u'$ will break the longitudinal portion $v$ of the rabbeted joint at the bottom of the pocket and the similar portion of the joint at the top of the pocket, (indicated at v'.) As already stated, this block u may be allowed to remain in the stile until the casing is being set, before the longitudinal fractures of the rabbeted joints are made.

I claim as my invention—

1. The combination with a pair of saws set in parallel planes and spaced apart, the cutting edges of the saws facing each other, means for causing the simultaneous advance of the saws, and a carriage located between the saws and being perpendicular to their planes and parallel with their cutting edges, and means for reciprocating the carriage in a direction longitudinal as to the saws, substantially as described and for the purpose set forth.

2. The combination with a reciprocating carriage, of saws set parallel with the direction of movement of the carriage, and in planes intersecting its plane, the saws being arranged in pairs whose members are upon opposite sides of the carriage and are offset laterally as to each other, and of means for causing the simultaneous advance of the saws, substantially as described and for the purpose set forth.

3. The combination with a reciprocating carriage, of two pairs of saws set parallel with the direction of movement of the carriage, the members of each pair of saws being upon opposite sides of the table and offset laterally as to each other, three of the saws being in planes perpendicular to the table and the fourth saw being in a plane oblique thereto, and of means for simultaneously advancing the saws, substantially as described and for the purpose set forth.

4. The combination with a pair of saws arranged to form the cuts from opposite sides of an article and located in different planes, such saws being fixed against longitudinal movement, of means for advancing the saws simultaneously until the united perpendicular depth of their cuts equals the thickness of the article, and a reciprocating frame for carrying the board or article, substantially as described and for the purpose specified.

5. In a machine for cutting pulley-stile pockets, the combination of a reciprocating carriage, with two pairs of offset opposing saws located upon opposite sides of the carriage and spaced apart to cut the opposite ends of the pocket, a frame for rigidly holding such saws against longitudinal motion, means for simultaneously advancing all the saws, substantially as described and for the purpose specified.

6. In a machine for cutting pulley-stile pockets, the combination of two pairs of offset opposing saws spaced apart to cut the opposite ends of the pocket, a frame for rigidly holding such saws against longitudinal motion, means for simultaneously advancing all the saws, a reciprocating frame for carrying the material to be operated upon, and means for limiting the advance of the saws to a common plane, substantially as described and for the purpose specified.

7. In a machine for cutting pulley-stile pockets, the combination of two pairs of offset opposing saws spaced apart to cut opposite ends of the pocket, one of said saws being set to approach the material obliquely and three of said saws being set to approach the material perpendicularly, a frame for rigidly holding such saws against longitudinal motion, means for simultaneously advancing all the saws, and a reciprocating frame for carrying the material to be operated upon, substantially as described and for the purpose specified.

8. In a machine for cutting rabbeted pockets in pulley-stiles, the combination with a reciprocating frame or carriage for carrying the stile to be cut, two pairs of offset saws arranged parallel with the movement of the carriage for making the cuts upon both sides of the stile, and at both ends of the pocket, and blocks for carrying the saws and having a reciprocating motion whereby they are carried to and from the stile, of means for holding the blocks normally away from the stile, cams for advancing the saws, and means for controlling the cams, substantially as described and for the purpose specified.

9. In a machine for cutting rabbeted pockets in pulley-stiles, the combination with a reciprocating frame or carriage for carrying the stile to be cut, two pairs of offset saws arranged parallel with the movement of the carriage for making the cuts upon both sides of the stile and at both ends of the pocket, and blocks for carrying the saws and having a reciprocating motion whereby they are carried to and from the stile, of means for holding the blocks normally away from the stile, wedge-shaped cams for advancing the saws, and means for controlling the cams, substantially as described and for the purpose specified.

10. In a machine for cutting rabbeted pockets in pulley-stiles, the combination with a reciprocating frame or carriage for carrying the stile to be cut, saws arranged parallel with the movement of the carriage for making the cuts upon both sides of the stile and at both ends of the pocket, and blocks for carrying the saws and having a reciprocating motion whereby they are carried to and from the stile, wedge-shaped cams for advancing the saws, reciprocating rods for carrying the cams, racks mounted upon the rods, gears coöperating with the racks, shaft for carrying the gears, a worm-wheel mounted upon the shaft, a worm-rod for driving the worm-wheel, and a hand-crank for turning the worm-rod, substantially as described and for the purpose specified.

11. In a machine for cutting rabbeted pockets in pulley-stiles, the combination with saws for making the cuts upon opposite sides of the stile and at opposite ends of the pocket, blocks for carrying the saws, rails to which the blocks are adjustably secured, wedge-cams for advancing the saws, reciprocating rods to which the cams are adjustably secured and means for reciprocating the rods, substantially as described and for the purpose specified.

12. In a machine for cutting pockets in pulley-stiles, the combination with a reciprocating frame or carriage for carrying the stile to be operated upon, of a pair of coöperating saws set to cut into opposite sides of the stile at one end of the proposed pocket and located in planes spaced apart, a second pair of coöperating saws set to cut into opposite sides of the stile at the opposite end of the proposed pocket, one of said last-named pair of saws being perpendicular to the stile and the other oblique thereto, and means for advancing the saws until the depth of each pair of the cuts from opposite sides of the stile unitedly equals the thickness of the stile, substantially as described and for the purpose set forth.

13. In a machine for cutting pulley-stile pockets the combination with a frame for carrying the material, of a pair of saws laterally offset as to each other and located upon opposite sides of the frame, one of such saws being perpendicular to the plane of the frame and the other oblique thereto, and means for causing the simultaneous advance of the two saws to a common plane, substantially as described and for the purpose set forth.

In witness whereof I have hereunto set my signature in the presence of two witnesses.

WALTER BLACK.

Witnesses:
JOHN BLACK,
LOUIS K. GILLSON.